(12) United States Patent
Sander et al.

(10) Patent No.: US 11,243,151 B2
(45) Date of Patent: Feb. 8, 2022

(54) DEVICE FOR CARRYING OUT BENDING TESTS ON PANEL-SHAPED OR BEAM SHAPED SAMPLES

(71) Applicant: Fraunhofer-Gesellschaft Zur Foerderung Der Angewandten Forschung E.V., Munich (DE)

(72) Inventors: Christoph Sander, Dresden (DE); Martin Gall, Dresden (DE); Frank Macher, Dresden (DE); Andre Clausner, Dresden (DE); Ehrenfried Zschech, Moritzburg (DE)

(73) Assignee: FRAUNHOFER-GESELLSCHAFT ZUR FOERDERUNG DER ANGEWANDTEN FORSCHUNG B.V., Munich (DE)

( * ) Notice: Subject to any disclaimer, the term of this patent is extended or adjusted under 35 U.S.C. 154(b) by 280 days.

(21) Appl. No.: 16/498,404

(22) PCT Filed: Mar. 29, 2018

(86) PCT No.: PCT/EP2018/058190
§ 371 (c)(1),
(2) Date: Sep. 27, 2019

(87) PCT Pub. No.: WO2018/178288
PCT Pub. Date: Oct. 4, 2018

(65) Prior Publication Data
US 2020/0309652 A1      Oct. 1, 2020

(30) Foreign Application Priority Data
Mar. 29, 2017   (DE) ..................... 10 2017 205 362.3

(51) Int. Cl.
G01N 3/06      (2006.01)
G01N 3/20      (2006.01)
G01N 3/62      (2006.01)

(52) U.S. Cl.
CPC ............... *G01N 3/066* (2013.01); *G01N 3/20* (2013.01); *G01N 3/62* (2013.01);
(Continued)

(58) Field of Classification Search
CPC ... G01N 2203/0482; G01N 2203/0264; G01N 2203/0096; G01N 2203/0067;
(Continued)

(56) References Cited

U.S. PATENT DOCUMENTS 3,031,886 A   5/1962  Larsson et al.
5,231,882 A   8/1993  Bertele et al.
(Continued)

FOREIGN PATENT DOCUMENTS

CN    103698202    4/2016
DE      3133646    3/1983
(Continued)

OTHER PUBLICATIONS

International Search Report dated Jul. 5, 2018.
German Office Action dated Nov. 13, 2017.

*Primary Examiner* — Jonathan M Dunlap
(74) *Attorney, Agent, or Firm* — Jacobson Holman PLLC

(57) ABSTRACT

The invention relates to a device for carrying out bending tests on panel-shaped or beam-shaped samples (1), in which two rotary drives are arranged at a distance from one another and a flange (3) is fastened to each of the drive shafts of the rotary drives, said drive shafts being oriented parallel to one another. At least two bar-shaped bending elements (2) oriented parallel to the axis of rotation of the drive shafts and arranged at a distance from the axis of rotation and at a
(Continued)

distance from one another are provided on each of the flanges (3). A panel-shaped or beam-shaped sample (1) can be introduced between the two bar-shaped bending elements (2) on the two flanges (3). In the event of rotation of the rotary drives in opposite directions of rotation, bending forces are exerted on the sample (1) and each of the two rotary drives can be controlled individually and connected to an electronic open-loop or closed-loop control unit.

13 Claims, 14 Drawing Sheets

(52) U.S. Cl.
CPC ........... *G01N 2203/0003* (2013.01); *G01N 2203/0017* (2013.01); *G01N 2203/0023* (2013.01); *G01N 2203/0037* (2013.01); *G01N 2203/0064* (2013.01); *G01N 2203/0066* (2013.01); *G01N 2203/0067* (2013.01); *G01N 2203/0096* (2013.01); *G01N 2203/0264* (2013.01); *G01N 2203/0282* (2013.01); *G01N 2203/0482* (2013.01)

(58) Field of Classification Search
CPC ... G01N 2203/0066; G01N 2203/0017; G01N 2203/0064; G01N 2203/0037; G01N 2203/0023; G01N 2203/0003; G01N 2203/0282; G01N 3/20; G01N 3/066; G01N 3/62
See application file for complete search history.

(56) References Cited

U.S. PATENT DOCUMENTS

| | | | |
|---|---|---|---|
| 6,055,867 A * | 5/2000 | Dunne | .............. G01N 3/32 73/159 |
| 2003/0192385 A1 | 10/2003 | Uhlik et al. | |
| 2006/0213281 A1 | 9/2006 | Doak et al. | |
| 2011/0248739 A1 | 10/2011 | Kim et al. | |

FOREIGN PATENT DOCUMENTS

| | | |
|---|---|---|
| DE | 4104822 | 8/1992 |
| EP | 0499943 | 8/1992 |

\* cited by examiner

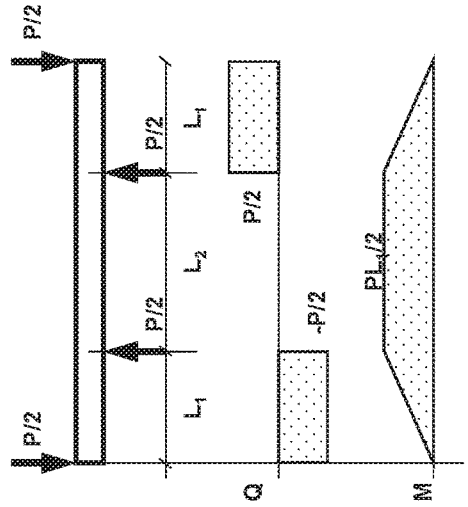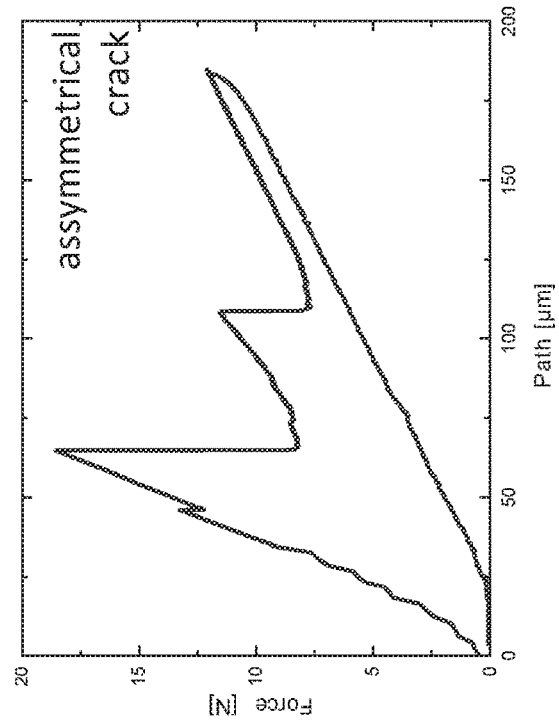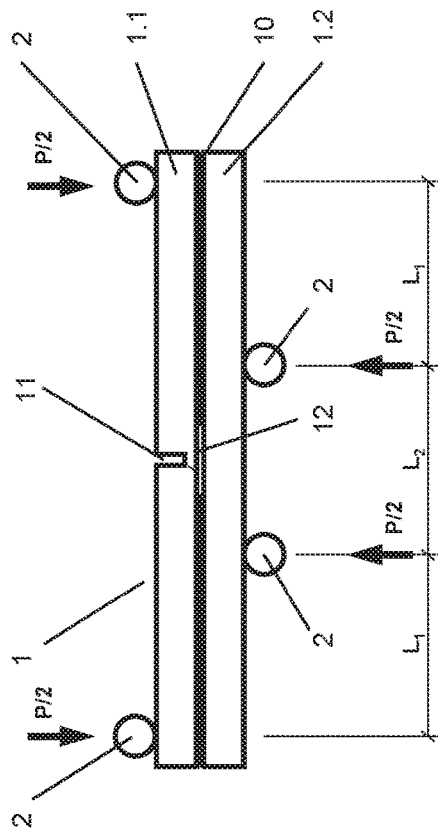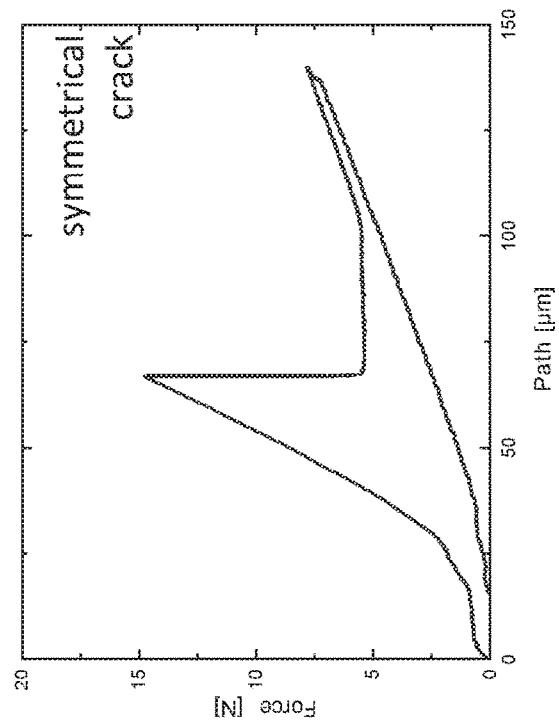
Fig. 14

DEVICE FOR CARRYING OUT BENDING TESTS ON PANEL-SHAPED OR BEAM SHAPED SAMPLES

The invention relates to a device for carrying out bending tests on slab-shaped or beam-shaped specimens. Specimens herein can be bent in two opposite directions so as to have homogenous or non-homogenous bending moments such that tensile stresses or compressive stresses act on the surfaces of the respective specimen, depending on the bending direction. Tensile tests and delamination tests can inter alia be carried out on specimens by way of the invention.

One of the potential experimental geometries is the so-called four-point bending (4PB) test. The fracture toughness and, in the case of composite-type specimens, the adhesion of layers which are configured in a boundary layer of a sandwich specimen can be determined herein. During such a four-point-bending test, beam-shaped specimens with a defined geometry and defined dimensions are bent. The respective beam-shaped specimen is deformed with the aid of four pins in which at least two pins serve as bearing pins. Two pairs of pins herein are in each case disposed on the lower side and on the upper side of the specimen and are aligned so as to be mutually parallel. For tensile stresses on the specimen upper side, the pins that are disposed on the lower side have a smaller mutual spacing than the pin pair disposed on the upper side (for compressive stresses on the specimen surface, the pin pair is disposed at a smaller spacing on the upper side). When bending the specimen, at least one pin pair is moved perpendicularly to the specimen surface (by means of a rotation of the pin receptacles), and compressive forces which cause the specimen to bend herein act on the surface. The bending moments between the smaller pin pair herein are homogenous across the specimen length. Asymmetries that arise during an experiment can also be counteracted by way of separate, non-parallel controlling of the pin movements, or said asymmetries can be provoked, if required.

Tests on the bent surface of the specimen are also often carried out in parallel to bending. The respective surface can thus be examined with a measuring apparatus, for example a microscope, in particular a raster electron microscope, during the bending. A low installation height and accessibility is required so as to enable a positive image quality at a low operating spacing of the microscope. When simultaneously removing material by way of a focused ion beam, the eucentric point of the ion and electron column is to be adhered to herein. Said eucentric point is apparatus-specific and requires the maximum permissible specimen height to be adhered to. However, in the case of the known devices, this is implementable only with difficulty and with increased complexity, depending on the electron microscope, but is readily implementable by way of the proposed device.

Moreover, a change between compressive stress and tensile stress can be implemented by way of corresponding bending on a surface of the specimen without having to remove the specimen and to modify the test setup. In the case of known devices, this is possible only by way of conversion measures including a potential interruption of the vacuum. For use in a raster electron microscope, the specimen herein has to be evacuated conjointly with the device from the vacuum chamber. Reciprocal stresses while simultaneously testing and without interrupting the vacuum are thus not implementable.

The drive utilized for the translatory movement of the pins for bending the specimen in terms of construction thereof is very complex when very small distances or distance differentials are to be considered when bending and a low installation height is to be adhered to.

It is therefore an object of the invention to increase the flexibility when carrying out bending tests with a load reversal on slab-shaped or beam-shaped specimens (optionally also by way of asymmetrical stress), while maintaining a low installation height, and to improve the accessibility on bent specimen surfaces for tests and manipulations, in particular under conditions in which the installation space of a vacuum chamber is restricted.

This object is achieved according to the invention by a device which has the features of the claims.

In the case of the device according to the invention, two rotary drives are disposed at a mutual spacing. One flange is in each case fastened to the mutually parallel aligned drive shafts of the rotary drives. At least two pins in the form of bar-shaped bending elements that are aligned so as to be parallel to the rotation axis of the respective drive shaft and at a spacing from the rotation axis and at a mutual spacing are in each case present on the flanges, wherein one slab-shaped or beam-shaped specimen is in each case introducible between the two bar-shaped bending elements at the two flanges, and bending forces are exerted on the specimen in a rotation of one or both of the rotary drives in opposite or identical rotation directions. The two rotary drives are in each case individually actuatable and connected to an electronic open-loop or closed-loop control unit.

The introduction of the specimen between the bar-shaped bending elements should preferably take place when a rotation angle of the flanges at which the bar-shaped bending elements are disposed on an axis which is not horizontally aligned has been set.

For homogenous stress states on the specimen surface and homogenous bending moments, the rotary drives should be in each case rotatable in opposite directions so as to have the same absolute rotation angle such that uniform bending of the specimen between the bar-shaped bending elements can be achieved.

By way of such an embodiment of the device according to the invention it is possible for tensile stresses and compressive stresses to be generated in an alternating manner on the bent surfaces of the specimen that are disposed opposite one another, without having to pause.

However, an asynchronous and asymmetrical rotation of the rotary drives in which the flanges at the same point in time can have dissimilar rotation angles is enabled on account of the decoupled movement of the two rotary drives and is particularly advantageous.

Stress gradients on the specimen surface between the respective inner bar-shaped bending elements which are disposed on the respective flange can be set in a targeted manner on account of an asynchronous and asymmetrical rotation. On account thereof, gradual stress differentials on the specimen surface can lead to stress-dependent effects such as is possible, for example, with a view to a preferably defined formation of cracks. Modified external influences such as, for example, temperature or atmospheric conditions, on a specimen can by tested by way of a multiplicity of simultaneous stress states, and critical stresses can be identified, on account of said set bending moment gradients (FIG. 7 and FIG. 8).

The decoupling of the rotary drives permits simple calibrating of the device and a high precision when carrying out bending tests. A targeted readjustment, for example in the event of lost steps of stepper motors as a rotary drive or in the event of gear play, can thus be carried out.

The electronic open-loop or closed-loop control unit can be connected to at least one sensor which is configured for determining torques or forces which act on at least one flange or at least one bar-shaped bending element and/or the specimen, and the measuring signals of said sensor can be used for the closed-loop controlling of the rotary movement of the flanges having the bar-shaped bending elements.

Advantageously, at least two sensors which are configured for determining the force that acts between a pin as the bar-shaped bending element and the specimen surface, or a torque that acts on a flange or bar-shaped bending element in the event of physical contact between the respective bar-shaped bending element and the specimen surface are present and accordingly disposed on the bar-shaped bending element, flange, and/or rotary drive, and are connected to the electronic closed-loop control unit. The electronic closed-loop control system should be configured for carrying out a calibration and/or establishing a zero-point contact.

Measuring of torque differentials can be carried out on the bar-shaped bending elements and/or flanges for the improved evaluation of bending tests for the stress-dependent testing of the specimen upper side and also 4PB adhesion tests on sandwich specimens. A readjustment in the event of moment imbalances on account of step losses of the rotary drives or gear play is also possible. For example, the zero point/contact point of the surface of the respective flange on the surface of the specimen can be determined with the aid of torque transducers, sensors suitable for determining torques, in combination with the flanges that are rotatable in a mutually independent manner. Calibrating can be carried out in an automated manner.

A calibration including the zero-point determination can be performed such that a specimen is inserted on the surfaces on vertically aligned bar-shaped bending elements (FIG. 1). Depending on the desired stress mode (compressive stress or tensile stress on the specimen upper side), the flanges having the bar-shaped bending elements can be rotated until all four bending elements are in physical contact with the specimen and a previously set minor torque threshold value is measured by way of the contact forces acting on the force or torque sensors between flanges or bar-shaped bending elements and the drive (FIG. 2). The flanges are then reversed somewhat such that the torque becomes zero again. This position is set as the zero position or the contact position, respectively. The two flanges herein can be individually rotated. On account thereof, an absolute determination and calibration of the position can be dispensed with.

In the case of the 4PB test with sandwich specimens it is assumed that a crack which is introduced in the center of the specimen, on account of the homogeneous bending moment between the bearing points on the bar-shaped bending elements that are disposed inwardly on the flanges, is simultaneously propagated on two crack fronts in the boundary layer between the two adhesively bonded beams of a specimen in the direction of said inwardly disposed bar-shaped bending elements. In this case, a force plateau by way of which the energy release rate can be calculated can be measured. However, it often arises that a crack propagates from the specimen center in one only direction, this leading to the bending moment no longer being homogeneously distributed and the force/path curve not having any useful plateau. The moments which can be measured at the two flanges, or the forces and/or moments which can be measured on bar-shaped bending elements are no longer of equal size in this instance. On account thereof, the crack lengths can be measured indirectly. In this case, one or both flange rotation angles can be readjusted in a targeted manner such that a higher force intensity arises at the shorter crack and the crack growth preferably continues in this part such that the assumption of a synchronous crack growth is reestablished. Alternatively, the measured crack lengths can be directly evaluated and the energy release rate be thus established. A different calculation method which includes asymmetrical crack lengths is required to this end.

The bar-shaped bending elements should advantageously be configured so as to be convexly curved at least in surface regions which are in physical contact with the surface of the specimen. On account thereof, the frictional forces acting between the specimen surface and the bar-shaped bending elements can be reduced by way of the smaller linear bearing face achievable. To this end, bar-shaped bending elements can have a rotationally symmetrical cross section, for example.

The acting frictional forces can be further reduced in that the bar-shaped bending elements are formed having a shaft which is rigidly connected to the respective flange and on which a hollow cylinder is rotatably disposed. The hollow cylinder can rotate in the bending of the specimen, on account of which a lower effect of frictional forces can be observed.

The mutual spacing of the bar-shaped bending elements on the respective flanges should be variable. A variation of the acting bending forces and moments can be achieved on account thereof. To this end, the bar-shaped bending elements can be moved in a corresponding guide which can be configured in the form of an elongate bore, for example, and be fixed at a desired position. The fixing can be implemented by way of a clamping device, for example. The movement of the bar-shaped bending elements in the respective guide can be implemented by way of a suitable drive and optionally with an additional gearbox. Controlled influencing of the bending procedures is also possible on account thereof. The acting compressive forces, tensile forces, moments and bending radii can thus be varied.

Adapting the spacing of the drive shafts of the rotary drives is also possible, in particular when specimens of dissimilar dimensions are to be tested or dissimilar testing conditions are to be implemented.

Bar-shaped bending elements in the longitudinal axial direction thereof, which are aligned so as to be parallel to the rotation axes, should have a length which corresponds to at least 110% of the extent of the specimen in said axial direction. It can be ensured on account thereof that uniform bending of the specimen across the entire width in said axial direction of said specimen can be maintained.

A detent which prevents the specimen from wandering in an axial direction which is aligned so as to be parallel to the longitudinal axial direction of the non-deformed specimen should be present on at least one side of the device. Wandering of the specimen should particularly preferably be avoided in an axial direction that is aligned so as to be perpendicular to the rotation axes of the rotary drives. The clamping of the bar-shaped bending elements in the driving direction is suitable to this end. On the other side, the specimens upon insertion can be secured against wandering on the pins by a sheet-metal plate or on the housing by a rigid angle.

Reluctance or permanent-magnet stepper motors, hybrid stepper motors, or gear motors can be used as rotary drives.

Four bar-shaped bending elements can advantageously be in each case attached to the flanges and mutually disposed such that the specimen is in each case introducible between two bar-shaped bending elements forming one pair. The two pairs of bar-shaped bending elements that are conjointly fastened to one flange herein should be disposed on two opposite sides of the rotation axis of the respective flange, at a spacing from the rotation axis, and the bar-shaped bending elements of one pair should be disposed on two opposite surfaces of the specimen.

If the four bar-shaped bending elements are disposed in a mutually rectangular rather than square manner, the dissimilar spacings lead to further variation possibilities, FIGS. 10, 11, 12.

The different bending modes, the variably settable bending moments for gradual stress states, the comparatively low installation height, and the accessibility for measuring apparatuses by way of which tests are to be carried out on a bent surface of specimens are advantageous in comparison to the prior art. On account thereof, a specimen can also simultaneously be machined by an ion beam and monitored by an electron beam so as to be able to determine any relaxation effect that has arisen, for example.

A reversal of the bending direction by way of which compressive and tensile stresses are achieved on a surface of a specimen can be enabled by way of the invention by a simple reversal of the rotation direction of the rotary drives, without conversion measures. Mechanical stresses can thus be incorporated in the specimen material, the effects of said mechanical stresses being able to be examined by way of a microscope (raster electron microscope), for example.

Dissimilar specimens can be tested, this also applying to the thickness of said specimens, without conversions or at least only minor adaptations being required on the device.

The construction can readily be scaled and is suitable for macroscopic specimens as well as for in-situ testing in microscopes or in analytical measuring apparatuses.

The installation height above all is to be minimized in the vacuum chamber of a raster electron microscope. Moreover, lubricants and magnetizable metals are to be avoided, this being achievable by way of the invention.

Because of the low installation height required, the eucentric point of the ion and electron column of a REM/FIB system can thus be achieved.

When suitable specimen receptacles are attached, tensile tests can be carried out in that a specimen is fastened to the vertically aligned flanges, in each case to the upper bar-shaped bending element or to the bar-shaped bending elements that are disposed farthest from one another on two flanges, and the specimen is then stressed for tension while twisting the flanges in opposite directions, FIG. 13. The fastening of a specimen herein can be achieved in a form-fitting manner by means of bent end sides on two pins, by a clamping connection, or by materially integral connections (adhesive bonding, soldering/brazing, welding) at the end sides, so as to be able to carry out tensile tests with the device.

Three-point bending can be achieved using special holders, FIG. 9. The flanges herein are to be embodied such that the flange which does not have to be moved has only one bar-shaped bending element. The other flange is to be embodied such that a bar-shaped bending element is situated in the rotation axis. The second bar-shaped bending element in the case of this embodiment is to be positioned at a spacing from the first bar-shaped bending element, said spacing corresponding to half the distance of the rotation axes.

The invention is to be explained in an exemplary manner in more detail hereunder.

In the figures:

FIG. 1 schematically shows an example of a device according to the invention in a view and a position in which a specimen is introducible between bar-shaped bending elements;

Figure 13:
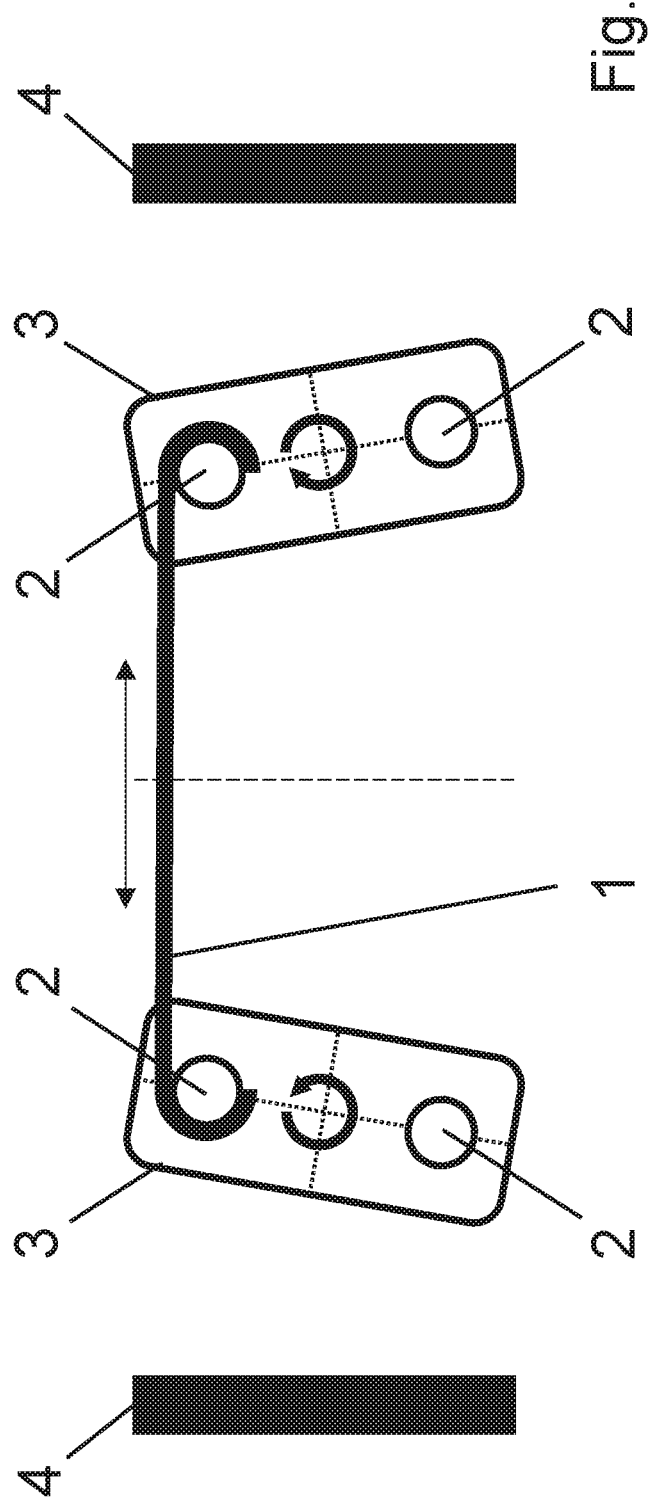

FIG. 13 shows a specimen which is bent at the outer end sides and in which the bent end sides are in each case bent in a form-fitting manner about one bar-shaped element which is in each case disposed on one flange such that a tensile test can be carried out in the rotation of the flanges in opposite rotation directions; and FIG. 14 schematically shows a specimen for carrying out a four-point bending test for measuring the adhesion characteristics of sandwich specimens in which the propagation of a crack can be influenced, or an asymmetrical crack opening can be counteracted by way of the invention, respectively, and the forces and moments that act in a corresponding manner, and the forces which arise by bending a specimen in the case of a symmetrical and an asymmetrical crack.

Figure 1:
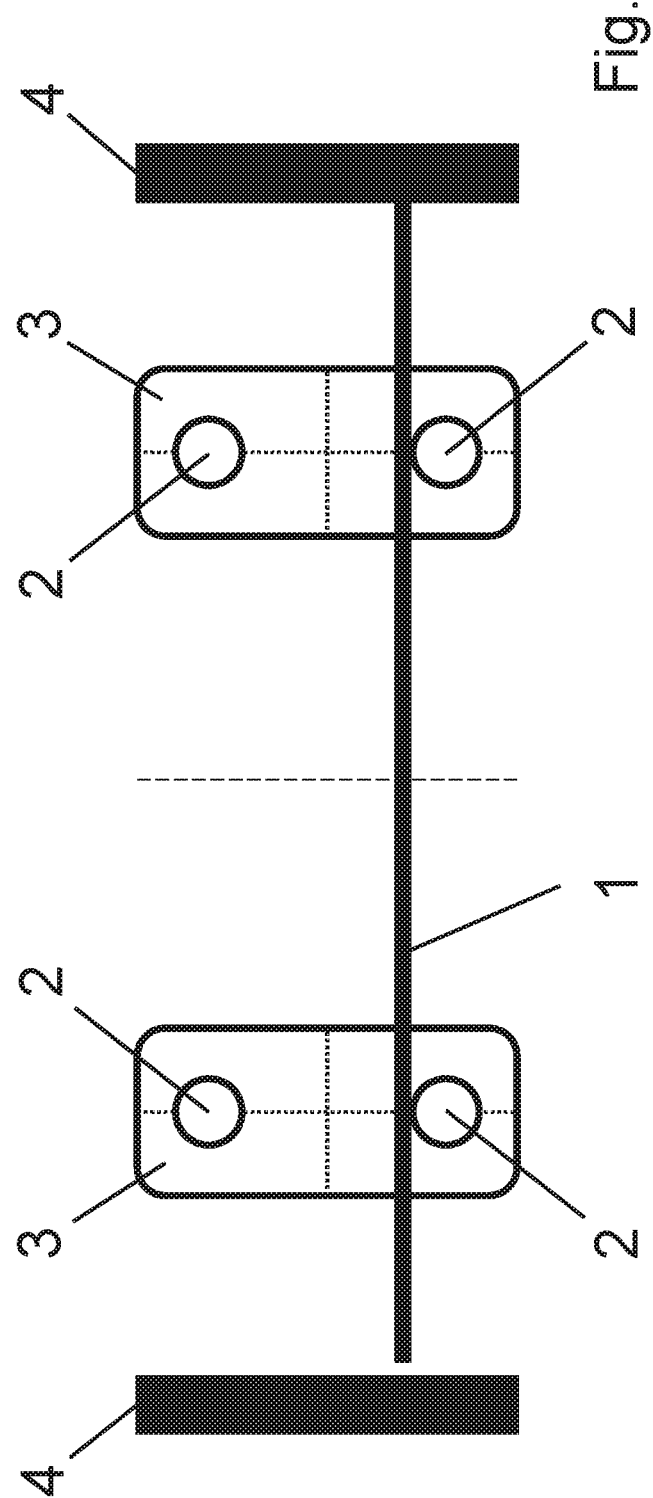

In the case of the example shown in FIG. 1, two flanges 3 which are in each case connected to one drive shaft of a rotary drive (not shown) are shown in a position in which the flanges 3 are twisted such that the two bending elements 2 fastened to the flanges 3 are disposed so as to be at a mutual spacing in a vertically aligned axis. To this end, the rotary drives have been activated such that the flanges have been rotated to this position.

The rotation axis is disposed in the centroid of the area of the flanges 3, where the plotted point-to-point lines intersect. The axis of the bending elements does not mandatorily have to run through the rotation axis.

In this position of the flanges 3, a slab-shaped or beam-shaped specimen 1 can be very easily placed on the bending elements 2 which are disposed vertically below on the flanges 3 and are aligned so as to be parallel to the rotation axis.

One detent 4 on which the respective end face of the specimen 1 can be supported so as to prevent any wandering of the specimen 1 along the longitudinal axis thereof is in each case present on the right and the left periphery shown here.

Figure 2:
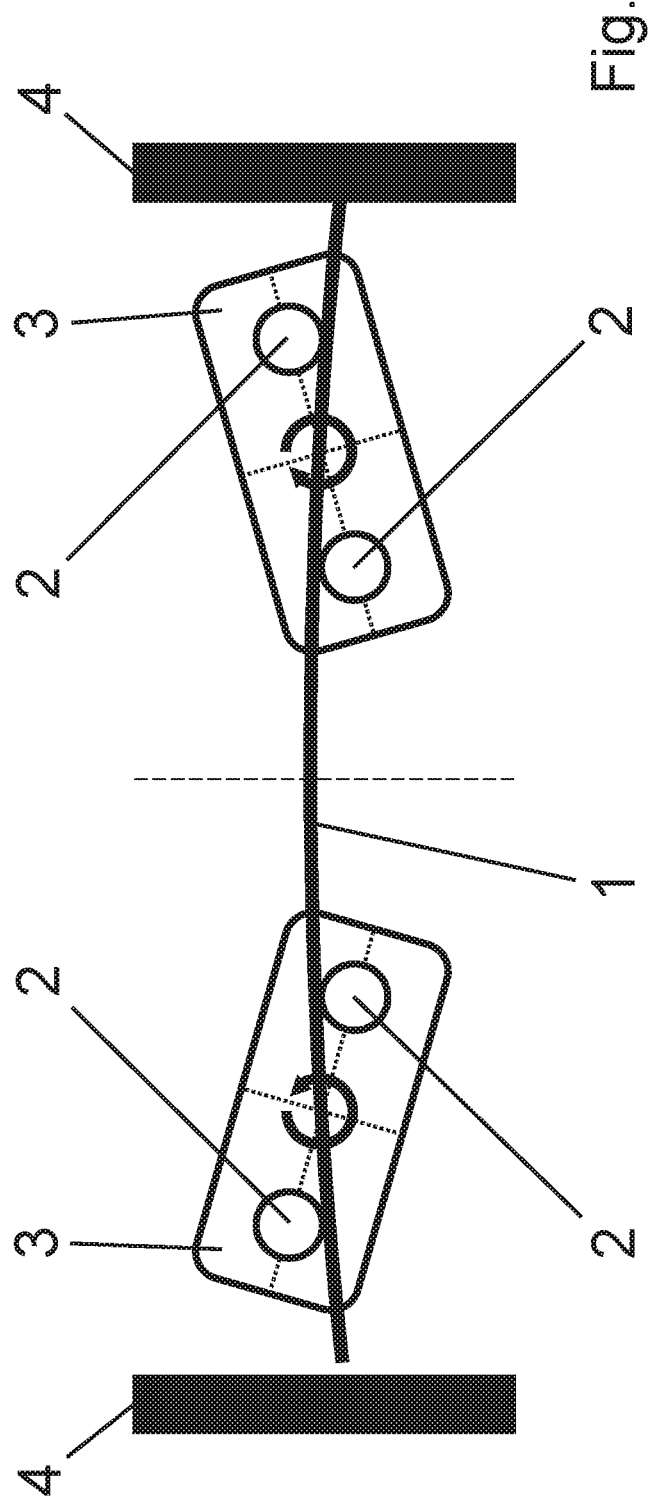
FIG. 2 shows the example as per FIG. 1 in a position in which the bar-shaped bending elements are positioned such that tensile stresses act on the upward-pointing surface of the bent specimen.

It is highlighted by way of the illustration in FIG. 2 how bending of the specimen 1 can be achieved, in which tensile stresses act on the upward-pointing surface of the specimen and the specimen 1 has been bent in a convex manner in this direction by way of compressive forces which act on the surfaces of the specimen 1 and are introduced by way of bar-shaped elements 2. To this end, the flanges 3 have been rotated as highlighted by the arrows. The bending of the specimen 1 takes place by means of the four bending elements 2 on account of the rotation of the flanges 3 having mutually opposite rotation directions.

Figure 3:
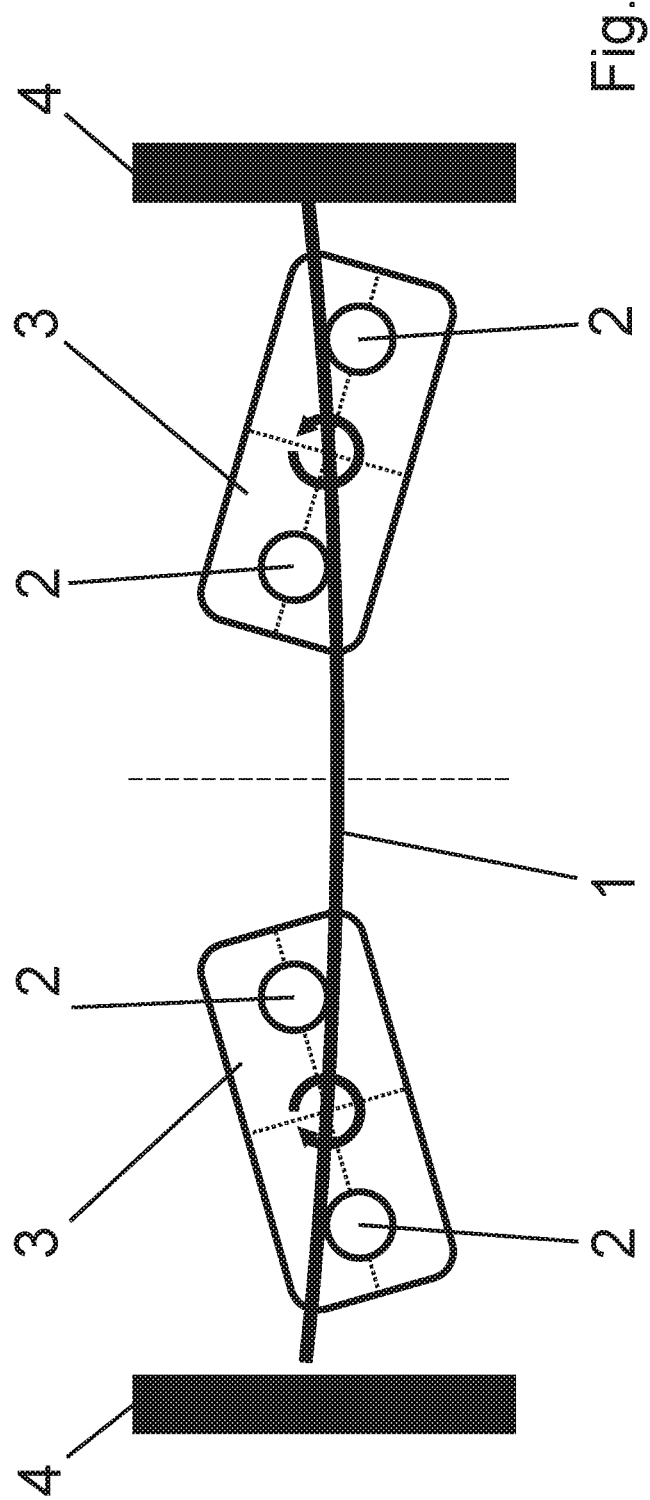
FIG. 3 shows the example as per FIG. 1 in a position in which the bar-shaped bending elements are positioned such that compressive stresses act on the upward-pointing surface of the bent specimen.

In the case of the bending position shown in FIG. 3, the flanges 3 by way of the respective bending elements 2 have been rotated in opposite rotation directions such that the specimen 1, when viewed from above, has been concavely deformed and compressive stresses act on the upward-pointing surface in the specimen material. This can be achieved by way of compressive forces which are exerted on the specimen 1 by way of the rotated bending elements 2.

A simple reversal of direction thus suffices in order for compressive stresses and then tensile stresses, or vice versa, to act in an alternating manner on surfaces of specimens 1. A conversion of the device to this end is not required.

Figure 4:
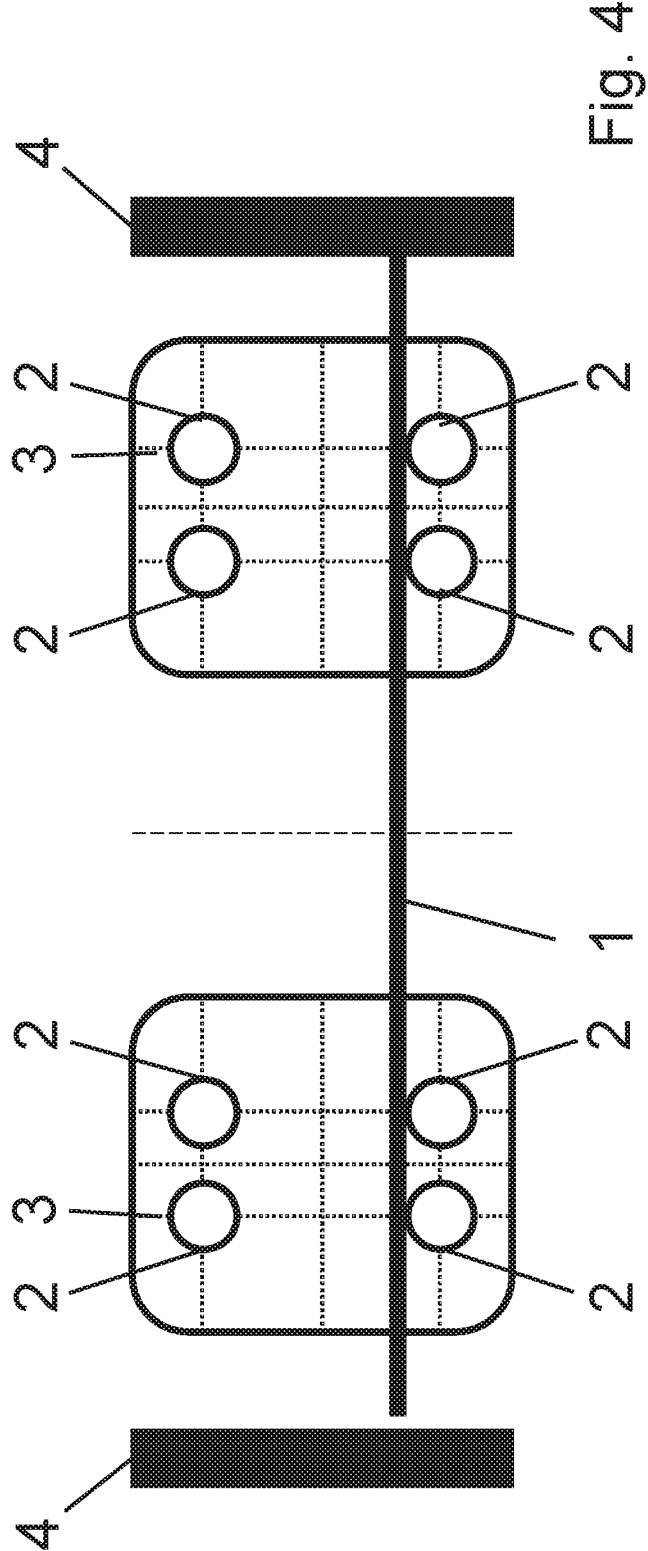
FIG. 4 shows an example in which four bar-shaped bending elements are in each case disposed on one flange.

FIG. 4 shows an example having four bending elements 2 which are in each case disposed on one flange 3. Two bending elements 2 herein are in each case disposed at a mutual spacing and at a spacing from the rotation axis of the respective flange 3 above and below the specimen 1. The spacings can in each case be identical on the upper and the lower side.

On account of the flanges 3 rotating in opposite directions, concave bending of the specimen 1 on the vertically upward-pointing surface conjointly with corresponding convex bending of the vertically lower specimen surface can in each case be achieved in one direction by way of an example thus configured, this leading to compressive stresses in the region of the vertically upper surface of the specimen 1 and to tensile stresses on the vertically lower surface of the specimen 1.

When the flanges then are rotated in respective opposite directions, bending and force effects arise in the exact opposite manner.

In the case of a disposal of the bending elements 2 vertically above and below the specimen 1, in which the specimen 1 can be disposed with minor play between the bending elements 2 disposed vertically above and below, changing stress effects on the surfaces of the specimen 1 can be achieved in a very simple and rapid manner when the rotation direction of the flanges 3 is changed in a correspondingly rapid and synchronous manner at the two flanges 3.

Figure 5:
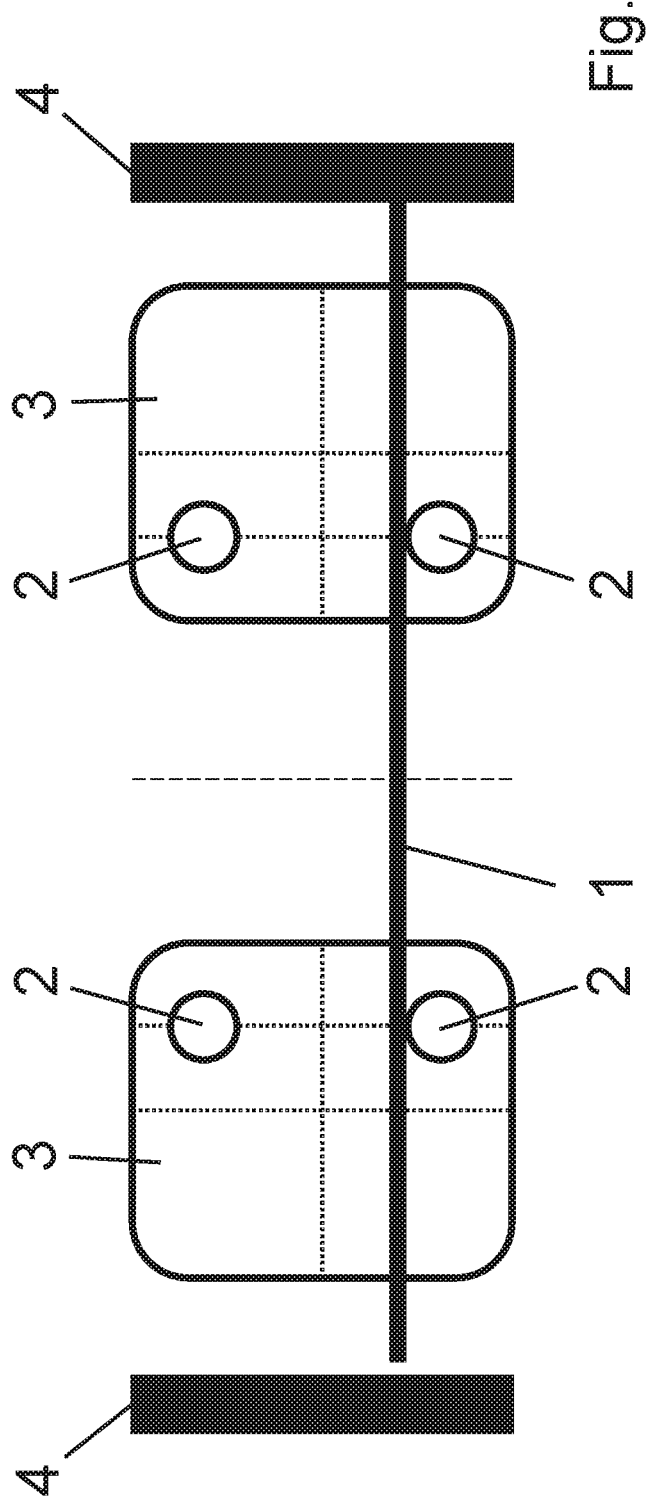
FIGS. 5 and 6 show in each case an example in which the bar-shaped bending elements are disposed on a flange so as to be non-symmetrical in relation to the rotation axis of the respective flange, in two positions of the flanges.
Figure 6:
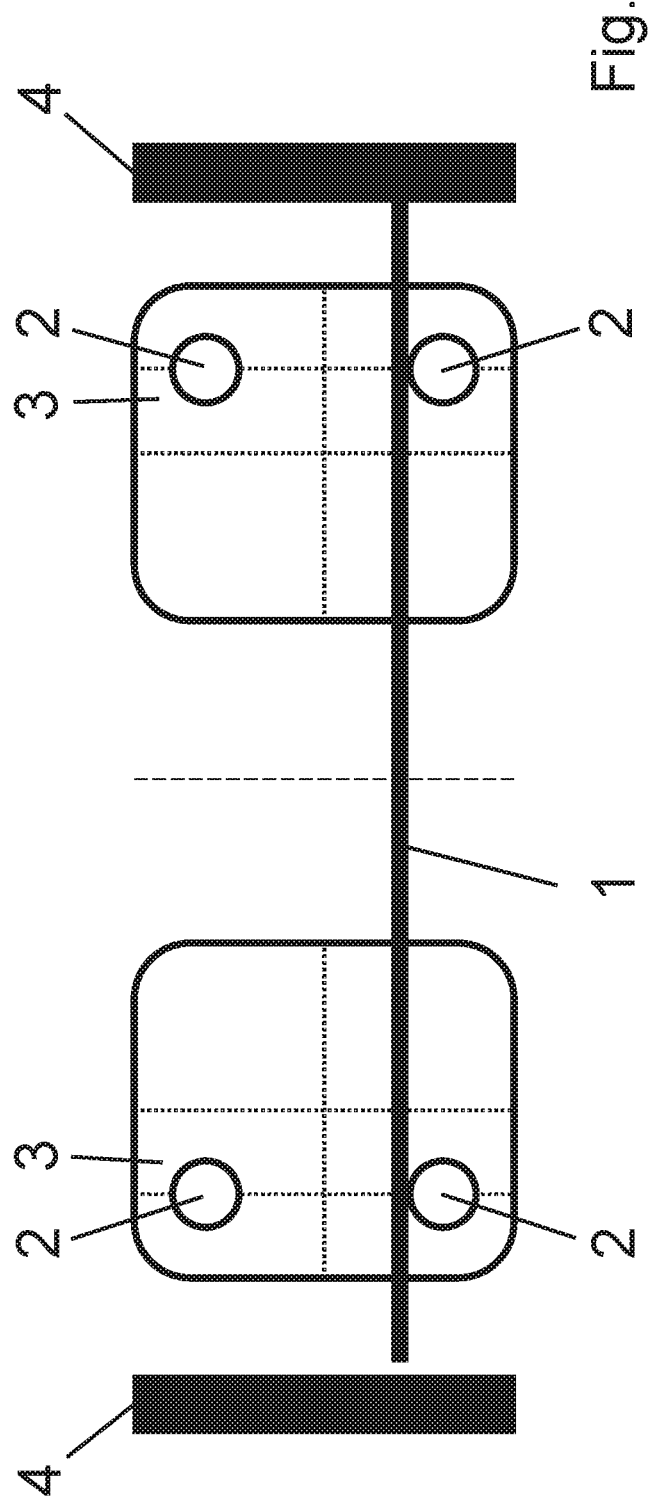

FIGS. 5 and 6 are intended to highlight that a non-symmetrical corresponding disposal of bending elements 2 on a flange 3 in relation to the rotation axis, which in this case is disposed in the centroid of the area of the respective flange 3, thus in the point of intersection of the point-to-point lines in the illustration, is possible in order for the corresponding force and bending effects to be exerted on the specimen 1.

Figure 7:
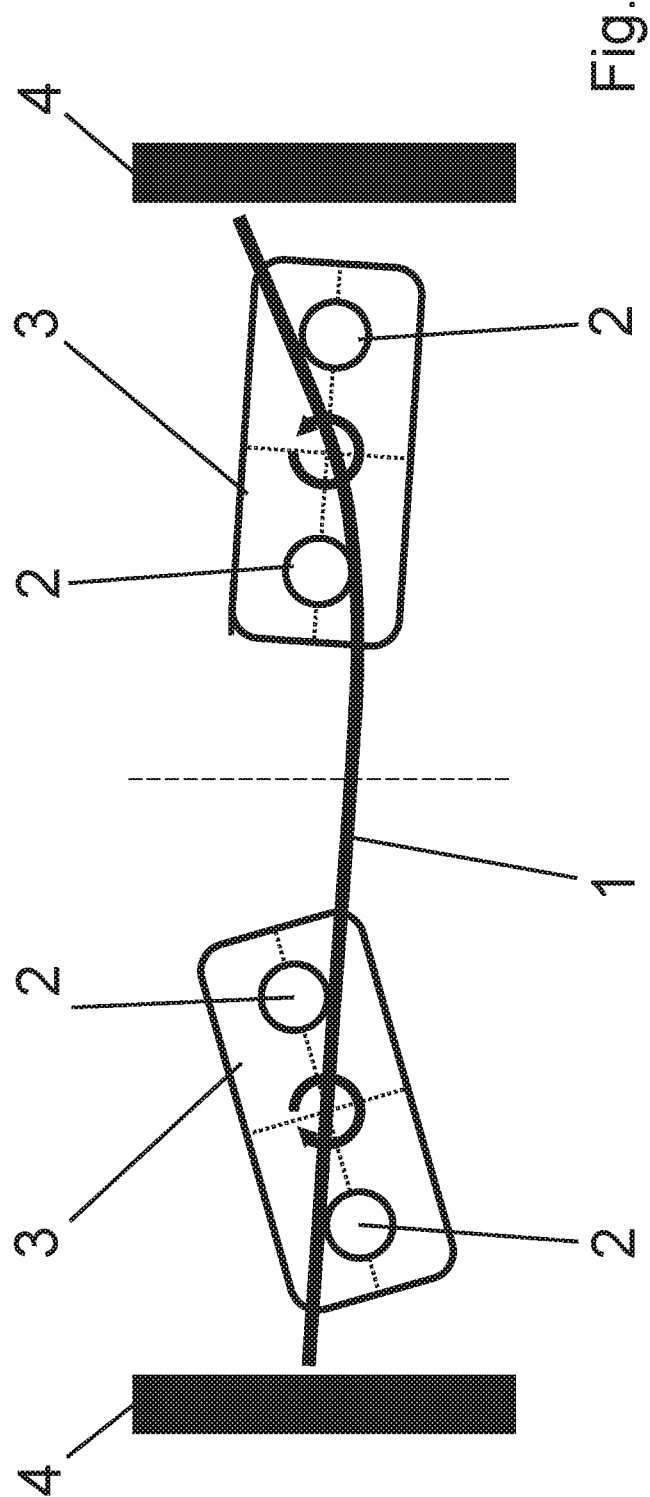
FIG. 7 shows an example in which the two flanges are twisted counter to one another, as in FIG. 3, but so as to have dissimilar rotation angles.
Figure 8:
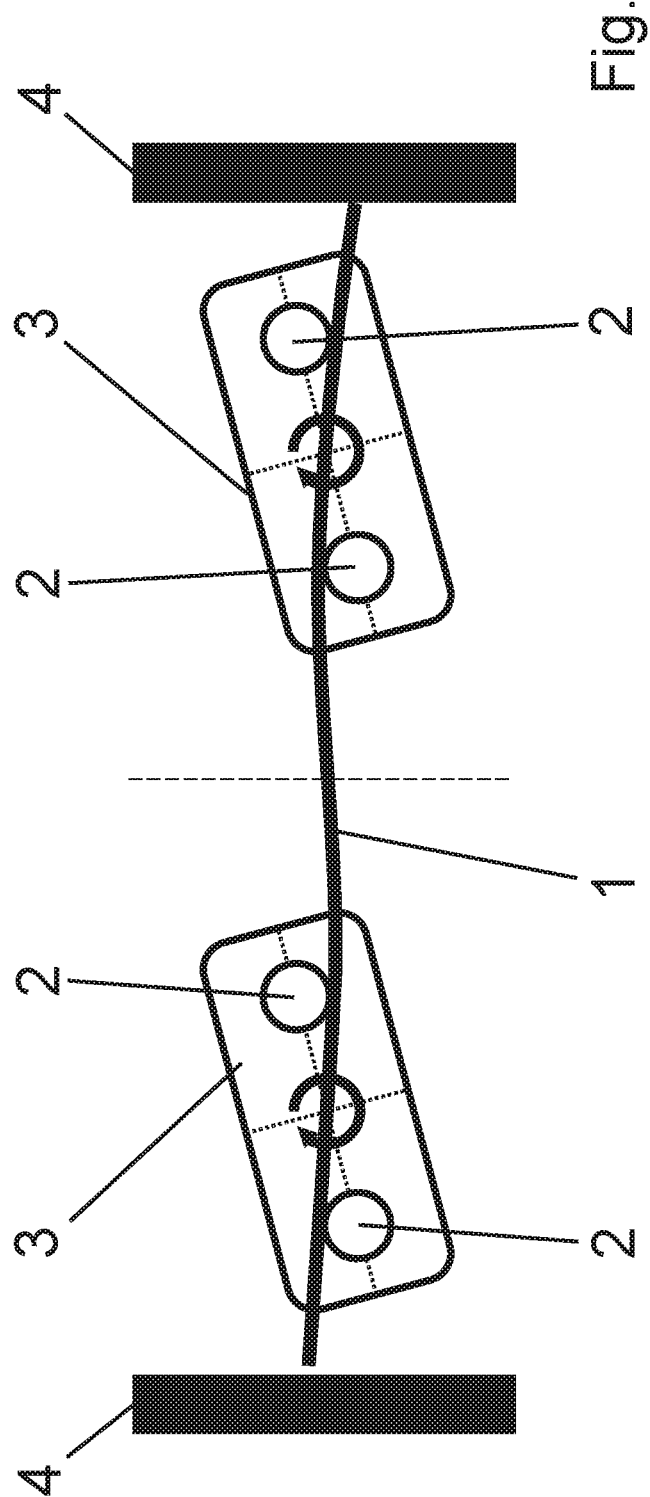
FIG. 8 shows an example in which the rotary drives have been rotated in the same rotation direction.

By way of FIGS. 7 and 8 it is intended to highlight possibilities pertaining to how, by way of dissimilar rotation of flanges 3, a specimen 1 can be bent by way of bar-shaped bending elements 2 in the rotation of the flanges 3.

Figure 9:
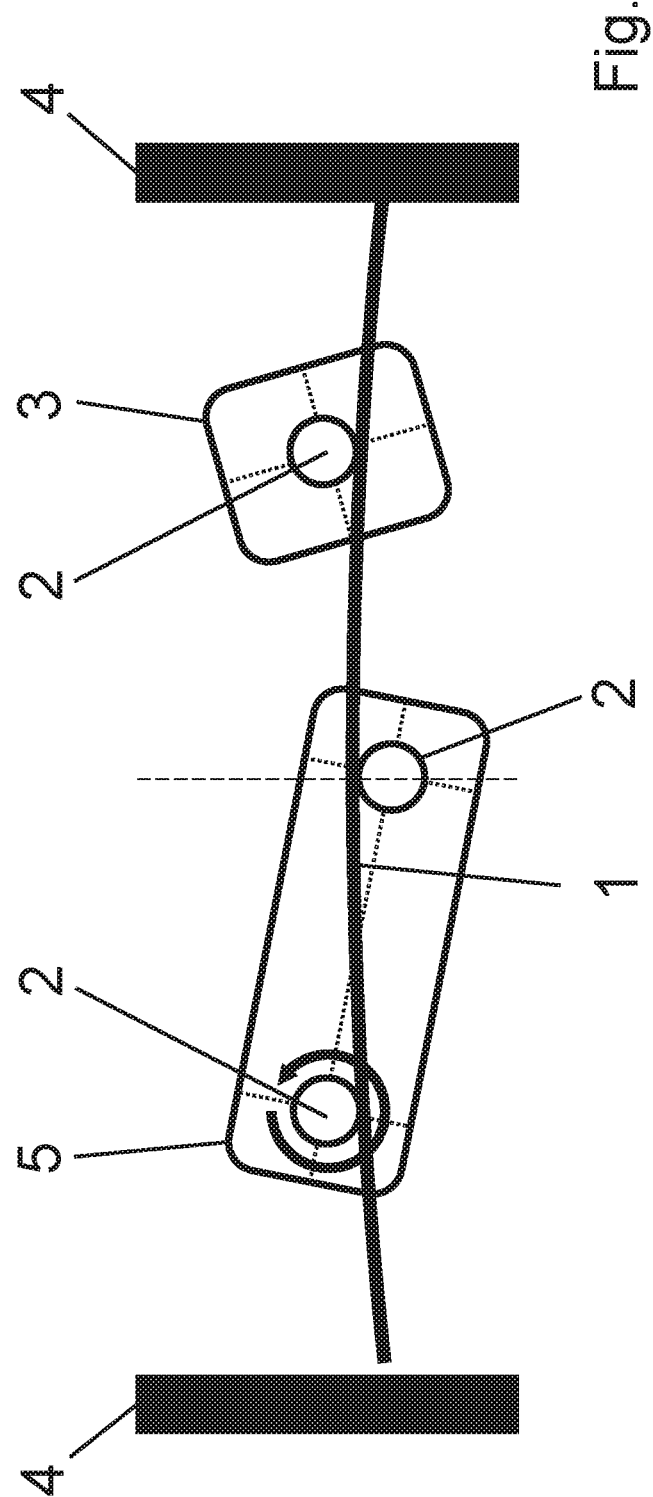
FIG. 9 shows an example in which an individual flange is held so as to be fixed, and bending of a specimen is achievable by way of a rotary drive and two bar-shaped bending elements that are disposed at a mutual spacing, and the fixed individual flange forms a counter holder for the specimen.

FIG. 9 shows an example for carrying out a 3-point bending test in which only one bar-shaped bending element 2 which can form a counter bearing in the rotation of the respective other flange 3 is disposed on a flange 3. In this instance, at least two bar-shaped bending elements 2 are disposed at a mutual spacing on said other flange, the specimen 1 being guided between said at least two bar-shaped bending elements 2 and bending of the specimen 1 being able to be achieved by the latter. Wherein one bending element 2 is situated in the rotation axis of the flange 3.

Figure 10:
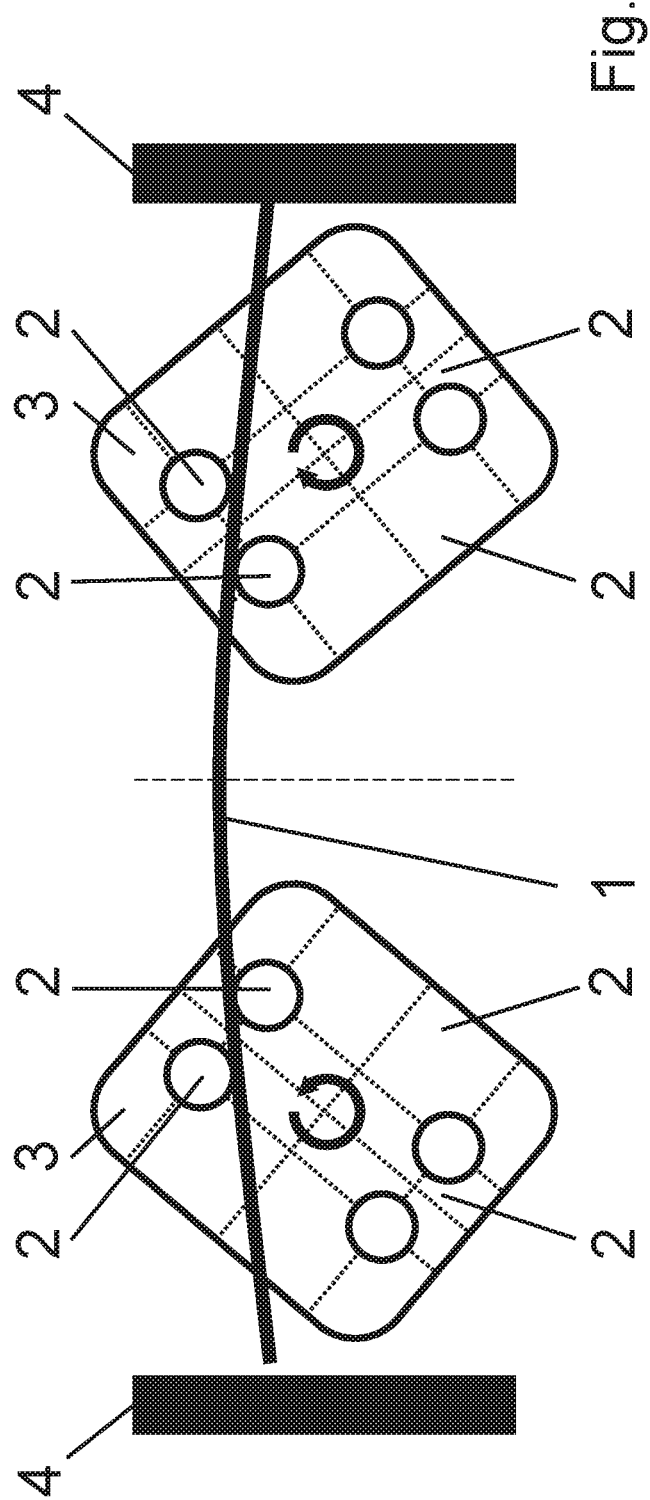
FIG. 10 shows the example as per FIG. 4, in which the specimen is in each case guided between two of the four bar-shaped bending elements, and bending of a specimen has been achieved by rotating the rotary drives in opposite directions.
Figure 11:
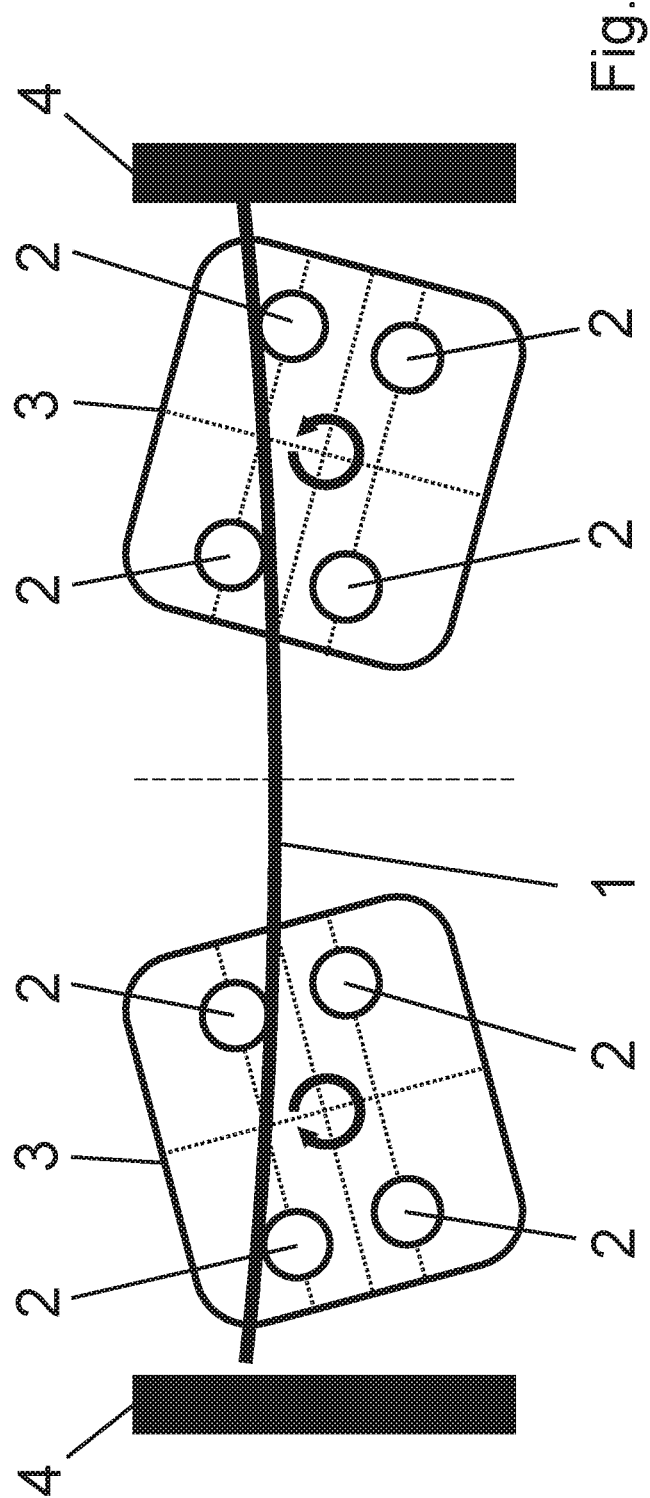
FIG. 11 shows an example according to FIG. 4, having modified bending element spacings, in which the specimen is disposed in a different position between the two flanges that are in each case rotatable by way of one rotary drive, and a rotation has in each case been achieved in an opposite direction by way of the rotary drives.
Figure 12:
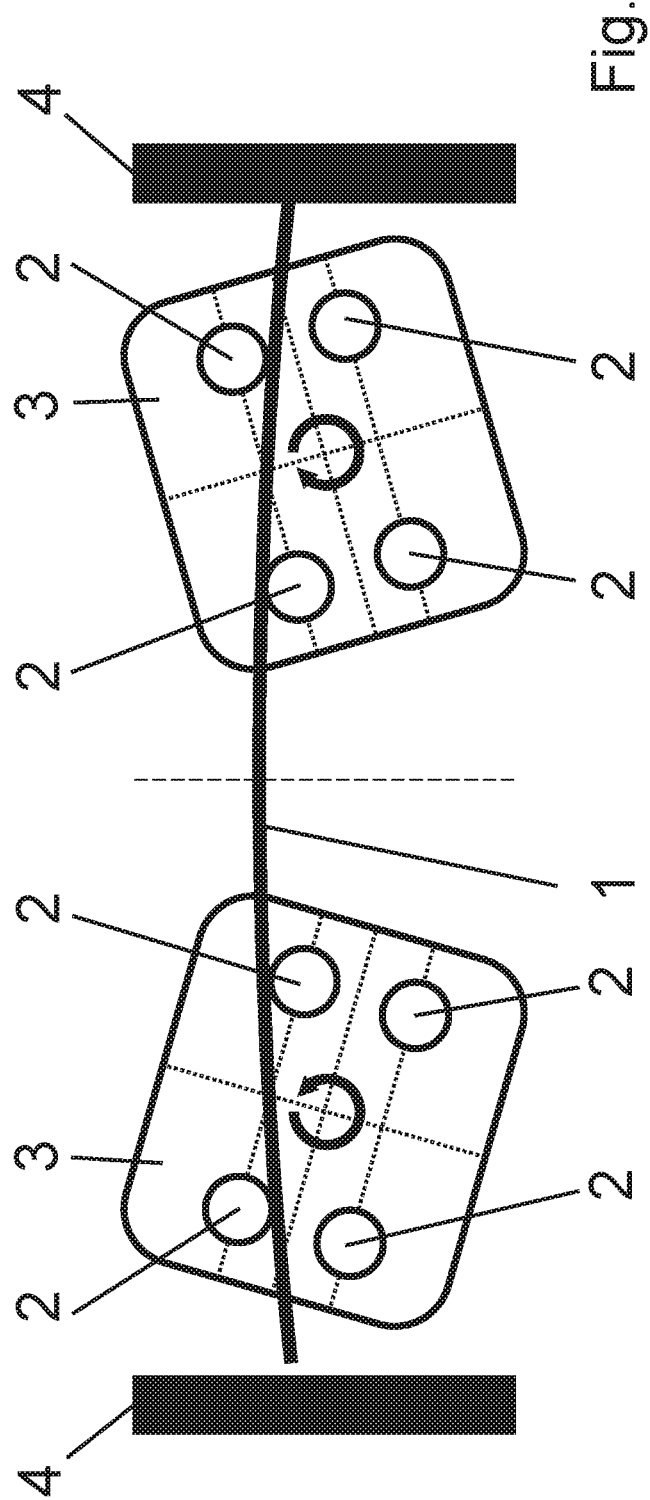
FIG. 12 shows the example as per FIGS. 4 and 11, having opposite rotation directions of the flanges and rotary drives.

FIGS. 10 to 12 show examples in which four bar-shaped elements 2 are in each case present on the flanges 3 and which in various forms can be used for the bending of a specimen 1 in the rotation of the flanges 3.

FIG. 13 shows an example for carrying out a tensile test. The end sides of the specimen 1 herein are bent such that said end sides engage behind the bar-shaped bending elements 2 at two flanges 3 and a form-fitting connection is thus achievable. A tensile test can be carried out when the flanges 3 are rotated by way of opposite rotation directions. To this end, forces and/or moments that are measured by sensors that are disposed and correspondingly configured on the flanges 3 and/or bar-shaped elements 2 can be utilized.

A specimen 1 which is configured as a sandwich specimen having two silicon plates 1.1 and 1.2 that are connected by way of an adhesive film 10 is shown in FIG. 14, said specimen 1 being subjected to a four-point bending test 4PB. A preliminary crack 11 is configured in the upper silicon plate 1.1. A crack propagation 12 can be configured along the connection face between the silicon plates 1.1 and 1.2 that are connected by way of the adhesive film 10 when bending the specimen 1.

It can be assumed that a crack 12 which is introduced in the center of the specimen 1, on account of the homogeneous bending moment between the inner bar-shaped bending elements 2 in the rotation of the latter and the bending of the specimen 1, is simultaneously propagated on two crack fronts in the boundary layer between the two adhesively bonded silicon plates 1.1 and 1.2 in the direction of the bar-shaped bending elements 2 that are disposed farther inward on the specimen 1. In this case, a force plateau by way of which the energy release rate can be calculated can be measured. However, it often arises that only one side cracks open, this leading to the bending moment no longer being homogeneously distributed and the force/path curve not having any useful plateau. The moments which can be measured on bar-shaped bending elements 2 or the associated flanges 3 are no longer of identical size in this instance. The crack lengths can thus be measured indirectly. In this case, one or both of the flanges 3 can be readjusted in a targeted manner such that a higher force intensity is established at the crack tip of the shorter crack and the crack growth preferably continues in this part such that the assumption of a synchronous crack growth can be reestablished. Or the measured crack lengths can be directly evaluated. Since the precondition of symmetry in this instance is no longer a given, a different calculation of the energy release rate is required while taking into account the dissimilar crack lengths.

The invention claimed is:

1. A device for carrying out bending tests on slab-shaped or beam-shaped specimens, in which two rotary drives with drive shafts are disposed at a mutual spacing and one flange is in each case fastened to mutually parallel aligned drive shafts of the rotary drives, and
- at least two bar-shaped bending elements that are aligned so as to the parallel to the rotation axis of the respective drive shaft and at a spacing from the rotation axis and at a mutual spacing are in each case present on the flanges, wherein
- one slab-shaped or beam-shaped specimen is in each case introducible between the two bar-shaped bending elements at the two flanges, and bending forces are exerted on the specimen in a rotation of the rotary drives in opposite rotation directions, and
- each of the two rotary drives is individually actuatable and is connected to an electronic open-loop or closed-loop control unit.

2. The device as claimed in claim 1, wherein the rotary drives are rotatable in a synchronous manner so as to have in each case the same rotation angle.

3. The device as claimed in claim 1, wherein the rotary drives are rotatable in an asynchronous manner, so as to have in each case a dedicated rotation angle.

4. The device as claimed in claim 1, wherein the electronic open-loop or closed-loop control unit is connected to at least one sensor which is configured for determining torques or forces which act on at least one flange, on at least one bar-shaped bending element, and/or the specimen, and the measuring signals of the sensor are utilizable for closed-loop controlling of rotating movement of the flanges.

5. The device as claimed in claim 1, wherein at least two sensors which are configured for determining the force that acts between a flange and/or bar-shaped bending elements and the specimen surface, or a torque that acts on a flange in the event of physical contact between a bar-shaped bending element and the specimen surface are present and accordingly disposed on the respective flange, bar-shaped element and/or rotary drive, and are connected to the electronic closed-loop control unit.

6. The device as claimed in claim 1, wherein the electronic closed-loop control unit is configured for carrying out a calibration and/or establishing a zero-point contact.

7. The device as claimed in claim 1, wherein the bar-shaped bending elements are configured so as to be convexly curved at least in surface regions which are in physical contact with the surface of the specimen.

8. The device as claimed in claim 1, wherein the mutual spacing of the bar-shaped bending elements on the respective flanges is variable.

9. The device as claimed in claim 1, wherein the bar-shaped bending elements are formed having a shaft which is rigidly connected to the respective flange and on which a hollow cylinder is rotatably disposed.

10. The device as claimed in claim 1, wherein a detent which prevents the specimen from wandering in an axial direction which is aligned so as to be parallel to a longitudinal axial direction of the non-deformed specimen is present on at least one side of the device.

11. The device as claimed in claim 1, wherein the rotary drives are configured as reluctance or permanent-magnet stepper motors, hybrid stepper motors, or gear motors.

12. The device as claimed in claim 1, wherein four bar-shaped bending elements are in each case attached to the flanges and mutually disposed such that the specimen is in each case introducible between two bending elements forming one pair, and the two pairs of bending elements that are conjointly fastened to one flange are disposed on two opposite sides of the rotation axis of the respective flange, at a spacing from the rotation axis, and the bending elements of one pair are disposed on two opposite surfaces of the specimen.

13. The device as claimed in claim 1, wherein two bar-shaped bending elements are attached to the flanges and disposed such that the rotation axis of the flanges does not lie on the connecting line of the bending elements.

* * * * *